(12) United States Patent
Fluerenbrock et al.

(10) Patent No.: US 10,603,969 B2
(45) Date of Patent: Mar. 31, 2020

(54) WHEEL SUSPENSION SYSTEM WITH A CONTROL ARM

(71) Applicant: Benteler Automobiltechnik GmbH, Paderborn (DE)

(72) Inventors: Dennis Fluerenbrock, Lippstadt (DE); Thomas Henksmeier, Wadersloh (DE); Aloys Schroeder, Paderborn (DE); Peter Stastny, Delbrueck (DE)

(73) Assignee: Benteler Automobiltechnik GmbH, Paderborn (DE)

( * ) Notice: Subject to any disclaimer, the term of this patent is extended or adjusted under 35 U.S.C. 154(b) by 233 days.

(21) Appl. No.: 15/802,198

(22) Filed: Nov. 2, 2017

(65) Prior Publication Data

US 2018/0126814 A1 May 10, 2018

(30) Foreign Application Priority Data

Nov. 4, 2016 (DE) .................. 10 2016 121 131

(51) Int. Cl.
*B60R 7/00* (2006.01)
*B60G 7/00* (2006.01)

(52) U.S. Cl.
CPC ............ *B60G 7/008* (2013.01); *B60G 7/001* (2013.01); *B60G 2200/1322* (2013.01); *B60G 2204/1432* (2013.01)

(58) Field of Classification Search
CPC .............. B60G 7/008; B60G 7/001; B60G 2204/1432; B60G 2200/1322; B60G 2206/016

See application file for complete search history.

(56) References Cited

U.S. PATENT DOCUMENTS

| 7,699,327 | B2 * | 4/2010 | Halfmann | B60G 7/008 280/124.107 |
|---|---|---|---|---|
| 8,628,139 | B2 * | 1/2014 | van Oirschot | B62D 21/155 296/187.09 |
| 2002/0180171 | A1 * | 12/2002 | Hasebe | B60G 7/02 280/124.134 |
| 2013/0241166 | A1 * | 9/2013 | Paintmayer | B60G 7/02 280/124.125 |
| 2015/0307133 | A1 * | 10/2015 | Mentzel | B60G 13/005 280/784 |
| 2016/0009153 | A1 * | 1/2016 | von Hasselbach | B60G 13/005 280/124.125 |
| 2016/0332496 | A1 * | 11/2016 | Saudemont | B60G 7/02 |

(Continued)

FOREIGN PATENT DOCUMENTS

| DE | 10 2014 207 772 A1 | 10/2015 |
|---|---|---|
| DE | 10 2014 226 536 A1 | 6/2016 |
| WO | WO 2015/193019 A1 | 12/2015 |

*Primary Examiner* — James A English
(74) *Attorney, Agent, or Firm* — Holland & Hart LLP (57) ABSTRACT

The disclosure relates to a wheel suspension system for a wheel suspension on an axle beam of a vehicle using a fastening screw, including: an entrainment element non-rotatably joinable with the fastening screw and configured to apply a torque to the fastening screw to release a force-locking fastening; and a control arm configured to be attached to the axle beam by the fastening screw and configured to act on the entrainment element during a rotational movement of the control arm with respect to the axle beam to produce the torque to release the force-locking fastening.

19 Claims, 12 Drawing Sheets

(56) References Cited

U.S. PATENT DOCUMENTS

2016/0339752 A1* 11/2016 Jensen ................... B60B 9/14
2017/0080766 A1*  3/2017 Koetzinger .......... B60G 15/068
2017/0197660 A1*  7/2017 Coppuck ............. B62D 21/152
2018/0056744 A1*  3/2018 Larsson .................. B60G 7/02
2018/0354327 A1* 12/2018 Giaier ..................... B60G 3/06

* cited by examiner

WHEEL SUSPENSION SYSTEM WITH A CONTROL ARM

CROSS-REFERENCE TO RELATED APPLICATIONS

This application claims priority to German patent application No. 10 2016 121 131.1, entitled "Radaufhängungssystem met einem Lenker", and filed on Nov. 4, 2016 by the assignee of this application, the entire disclosure of which is incorporated by reference for all purposes.

BACKGROUND

The present disclosure relates to a wheel suspension system with a control arm for the suspension of a wheel of a vehicle, especially a motor vehicle, on an axle beam of the vehicle.

In modern vehicles control arms, which are often disposed crosswise with regard to a longitudinal vehicle axis as a wishbone, are used to mount a wheel on an axle beam of a vehicle.

In the case of a frontal impact, according to the European New Car Assessment Programme (NCAP) tests, a 40% overlap or in the case of a small overlap crash according to the Insurance Institute for Highway Safety (IIHS) test 25% at 64 km/h in the area of the control arm, longitudinal beams are used to convert the impact energy into a deformation energy.

However, in case of less overlap than simulated by the NCAP test, the longitudinal beam can be missed so that the impact energy can be transmitted via the control arm to the axle beam. To solve this problem, additional reinforcements may be provided in the region of the wheel suspension. However, these presuppose that a control arm decouples in a defined manner in the event of an impact in order to reduce the transmission of the impact energy via the control arm.

It is the object of the present disclosure to provide a wheel suspension system with a control arm with which the transmission of the impact energy to an axle beam of a vehicle can be further reduced in the event of an impact, in particular in the case of a frontal impact or longitudinal impact with incomplete overlap.

SUMMARY

This object is achieved by the features of the independent claim. Advantageous further examples are the subject matter of the dependent claims, the description as well as the accompanying figures.

The disclosure is based on the finding that the above object is achieved by a dismantling, in particular by a mechanical fracture or shearing of the fastening screw, of the mechanical connection between a control arm and an axle beam, to which the control arm is mechanically fastened due to a rotational movement caused by an impact of the control arm.

According to a first aspect the disclosure relates to a wheel suspension system for a wheel suspension on an axle beam of a vehicle by means of a fastening screw, comprising an entrainment element, which is non-rotatably joinable with the fastening screw and configured to subject the fastening screw to a torque to release the force-locking fastening; and a control arm, which is attachable to the axle beam by means of the fastening screw and configured to act on the entrainment element during a rotational movement of the control arm with respect to the axle beam in order to produce the torque to release the force-locking fastening.

In an example the entrainment element comprises an entrainment leg, and wherein the control arm is configured to act on the entrainment leg during the rotational movement of the control arm. In other words, the entrainment leg is also rotated by the control arm during the rotation of the control arm, whereby as a result of the rotationally fixed connection between the entrainment element and the fastening screw, a torque is exerted on the fastening screw. If the torque exceeds a breaking torque of the fastening screw, this can break in a defined manner, whereby the mechanical connection can be released.

In an example the entrainment leg is shaped to laterally engage around the control arm to collide during a rotation of the control arm. In this manner it is ensured, that the entrainment leg is not displaced but carried by the rotating control arm.

In an example the control arm is configured to subject the entrainment element during the rotational movement of the control arm to a tangential force or to put the entrainment element in a rotational movement around a longitudinal axis of the fastening screw. Thereby, the torque to release the mechanical coupling is produced.

In an example the control arm comprises a protrusion, which is configured to act on the entrainment element, especially on the entrainment leg of the entrainment element during the rotational movement of the control arm. The control arm can thus carry the entrainment element more defined during the rotational movement.

In an example the entrainment element comprises an opening, which is penetrable by the fastening screw, wherein the fastening screw is receivable or is received in the opening for a non-rotatable coupling with the fastening screw in a form fitting manner. This ensures that the fastening screw is not rotated during the rotation of the control arm, so that the torque is transferred to the fastening screw. Thereby, the fastening screw can break, to release the mechanical coupling.

In an example the fastening screw comprises a screw section, especially a shaft portion or a screw head, with an angular or polygonal cross section, especially a quadrangular, pentagonal or hexagonal cross section, and wherein the opening is angular or polygonal to receive the angular cross section in a form fitting manner.

In an example the entrainment element is integrally molded as a sheet metal bracket.

In an example the entrainment element is disposed to exert the torque against a release direction of the fastening screw. The fastening screw can thus be broken to release the mechanical coupling.

In an example the entrainment element is configured to release the fierce-locking fastening by a break of the fastening screw. The break is made when the torque exceeds a breaking torque of the fastening screw.

In an example the axle beam is part of the wheel suspensions system, wherein the axle beam comprises a rotation lock to lock a rotational movement of the fastening screw.

In an example the axle beam comprises an aperture, which is penetrable by the fastening screw, wherein the rotation lock comprises, laterally to the aperture, at least a collar, which secures a screw head, which can be angular, of the fastening screw against rotation of the fastening screw, or wherein the aperture comprises a trough, which is configured to receive a screw head of the fastening screw in a form fitting manner. Thereby, the fastening screw itself is mounted non-rotatable.

In an example the rotation lock comprises oppositely disposed collars between which the screw head is positionable. Thereby, the fastening screw can be fixed non-rotatably.

In an example the axle beam comprises an aperture, wherein the control arm comprises a bearing opening, and wherein the bearing opening and the aperture are arranged or are arrangeable in alignment with each other and are penetrable by the fastening screw. Thereby, the axis of rotation of the control arm is specified.

In an example the control arm comprises a lateral edge with a retaining bead, wherein the axle beam comprises a receptacle recess for receiving the retaining bead, wherein the receptacle recess is deformable during the rotational movement of the control arm to release the retaining bead for the rotation of the control arm. The retaining bead is provided to fixate the control arm in the mounting position on the axle beam in case of an impact in free fall.

In an example the entrainment element is mounted between the axle beam and the control arm or between a nut of the fastening screw and the axle beam.

In an example the control arm is a wishbone.

BRIEF DESCRIPTION OF THE DRAWINGS

Examples of the principles of this disclosure are described with reference to the accompanying figures.

DETAILED DESCRIPTION OF THE DRAWINGS

Figure 1:
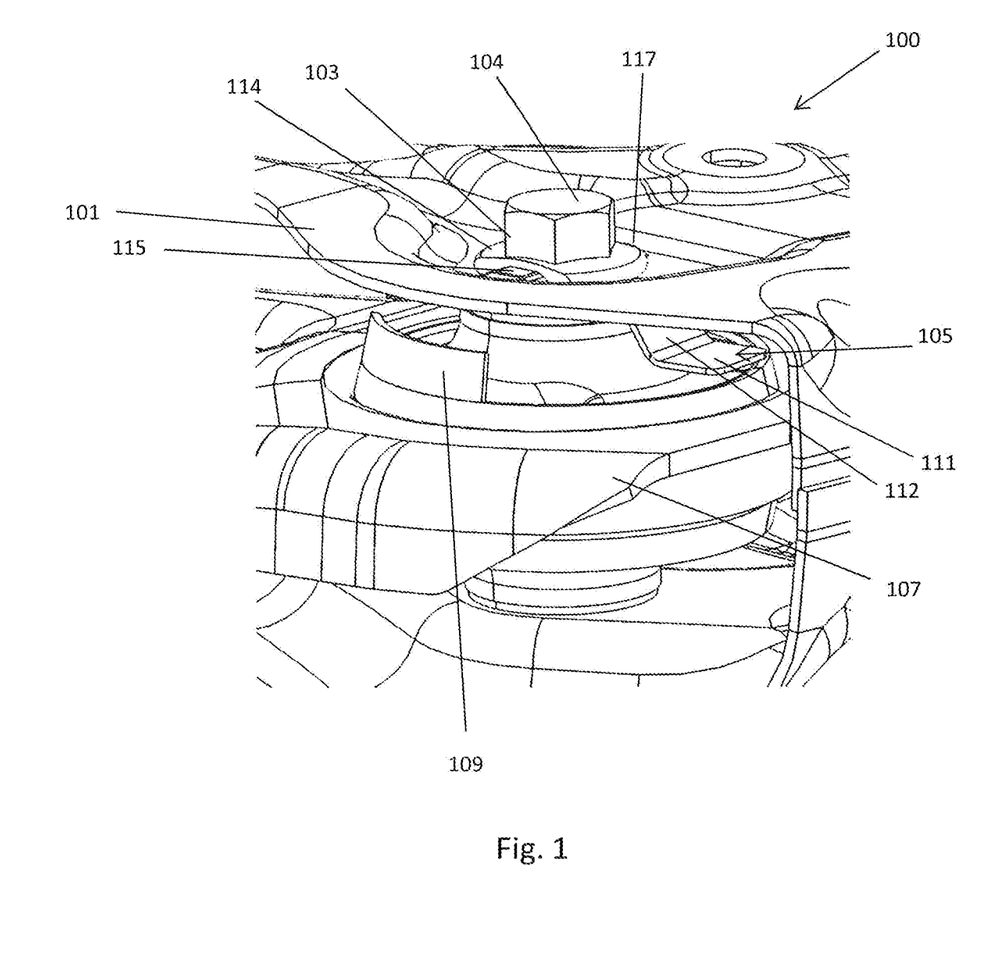
FIG. 1 shows a wheel suspension system according to an example.

FIG. 1 depicts a wheel suspension system 100 according to an example for the mounting of a wheel shown in FIG. 1 on an axle beam 101 of a vehicle by means of a fastening screw 103 in a force locking manner.

The wheel suspensions system 100 comprises an entrainment element 105, which is non-rotatably joinable with the fastening screw 103 and configured to subject the fastening screw 103 to a torque to release, especially by means of breaking, the force-locking fastening. Thereby, the fastening screw 103 provides a predetermined breaking point for the mechanical coupling.

The wheel suspension system 100 further comprises a control arm 107, which is attachable to the axle beam 101 by means of the fastening screw 103 and configured to act on the entrainment element 105 during a rotational movement of the control arm 107 with respect to the axle beam 101 in order to produce the torque to release the force-locking fastening. For this purpose the entrainment element 105 is subjected with a tangential force by the rotating control arm 107.

In an example the control arm 107 comprises a protrusion 109, which, for example, is molded as an axial collar section and which acts on the entrainment element 105 during the rotational movement of the control arm 107.

The entrainment element 105 is, for example, bent and comprises an entrainment leg 111, on which the control arm 107 acts during the rotation, especially over the protrusion 109. The entrainment leg 111 is connected to the base section 201 depicted in FIG. 2 by the transition section 112. The base section 201 serves for fastening of the entrainment element 111 and is, for example, penetrable by the fastening screw 103.

The axle beam 101 comprises a rotation lock 115, 117 in the area of the screw receptacle, which, for example, is formed by two oppositely disposed collars 115, 117, which non-rotatably fix a polygonal screw head 104 of the fastening screw. For this purpose the screw head 104 can comprise a plate section 114, which is laterally flattened in the area of the collars 115, 117.

Figure 2:
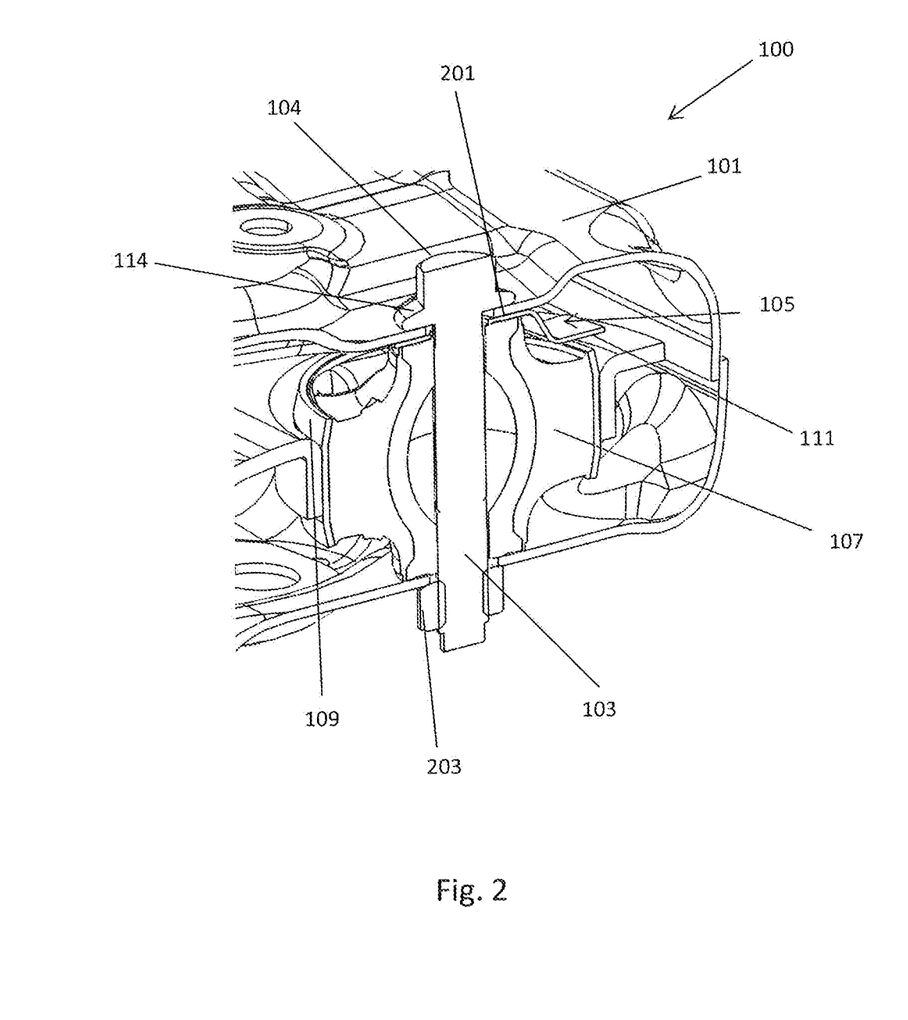
FIG. 2 shows a wheel suspension system according to an example.

In FIG. 2 a cross section of the wheel suspension system 100 from FIG. 1 is depicted. The fastening screw 103 is clampable to the control arm 107 by means of a nut 203.

The control arm 107 can be molded shell-shaped or as profile element.

In an example the entrainment element 105 is molded as a toothed element.

In the example depicted in FIG. 1 the entrainment element 105 is disposed at or in the vicinity of the screw head 104. This is advantageous when the upper screw shaft—under the screw head 104—for example has a hexagonal geometry. The entrainment element 105 and/or an aperture of the entrainment element 105 can as well comprise a corresponding geometry, whereby a form-fitting connection between both components can be produced.

Figure 3:
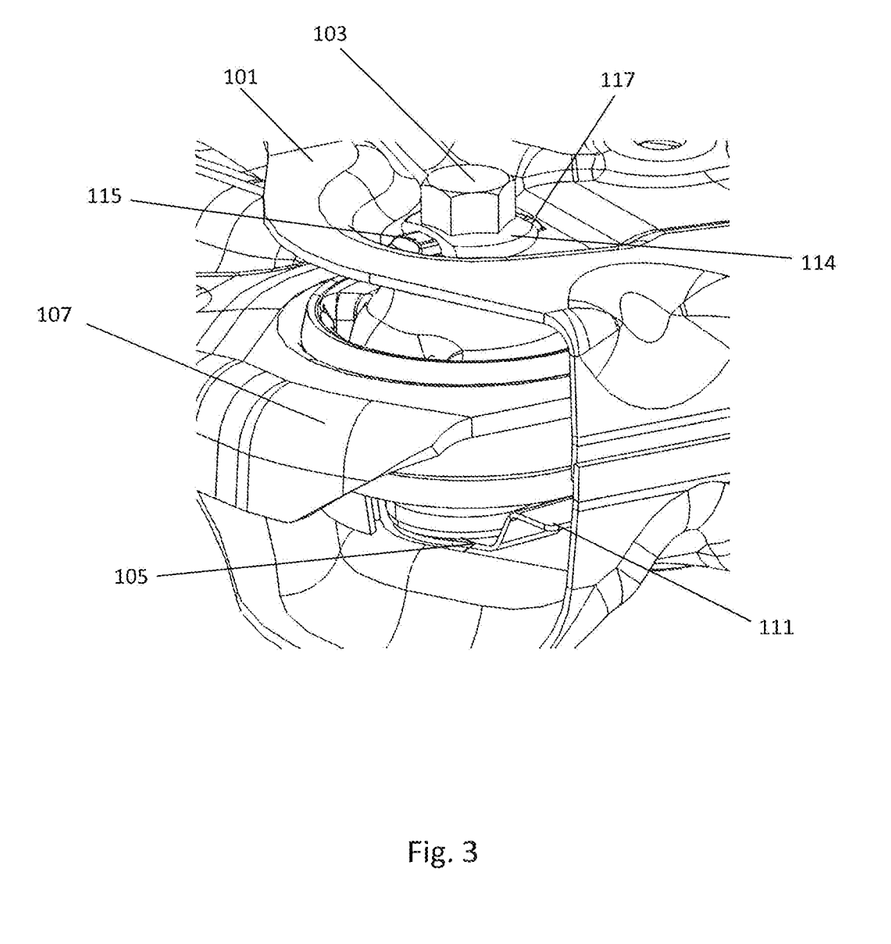
FIG. 3 shows a wheel suspension system according to an example.
Figure 4:
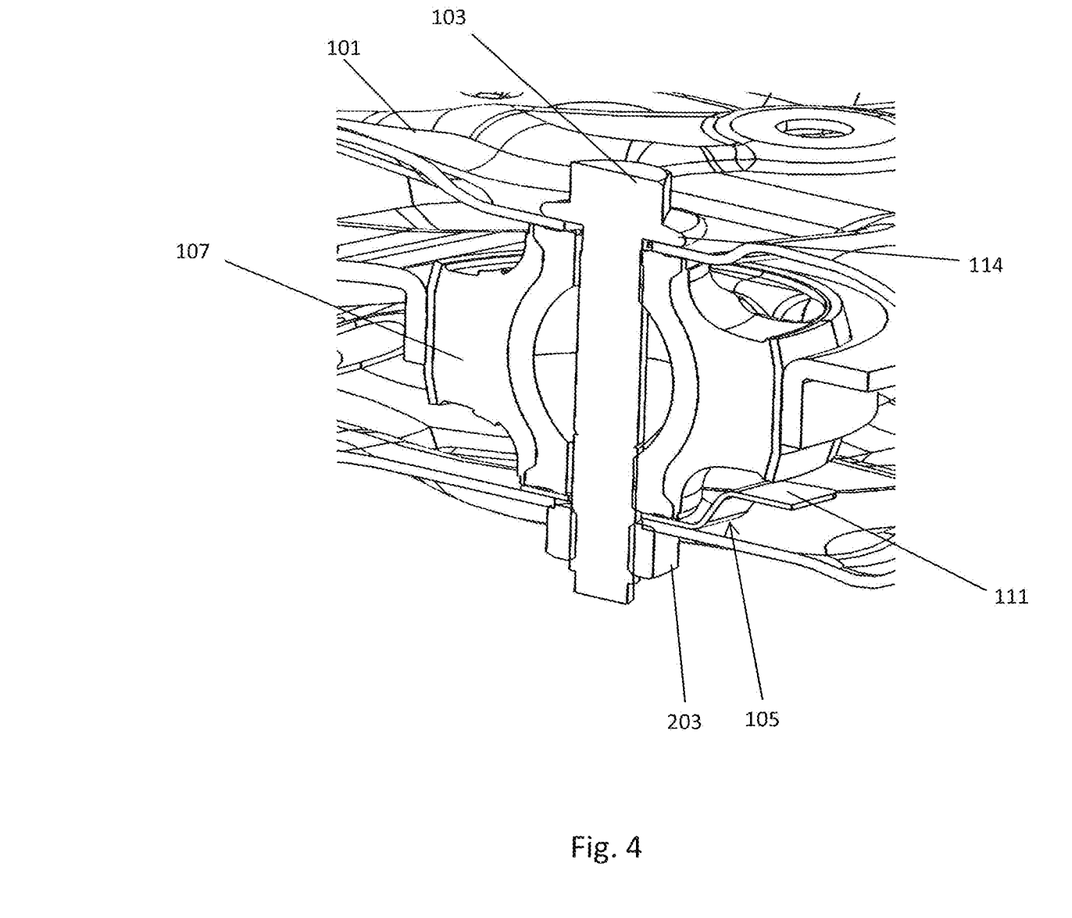
FIG. 4 shows a wheel suspension system according to an example.

In the examples depicted in FIGS. 3 and 4 the entrainment element 105 is disposed between the axle beam 101 and the control arm 107, respectively between the nut 203 and the axle beam.

In the examples of the wheel suspension system 100 depicted in FIGS. 5 and 6 the entrainment element 105 is disposed, for example, below the nut 203.

Figure 5:
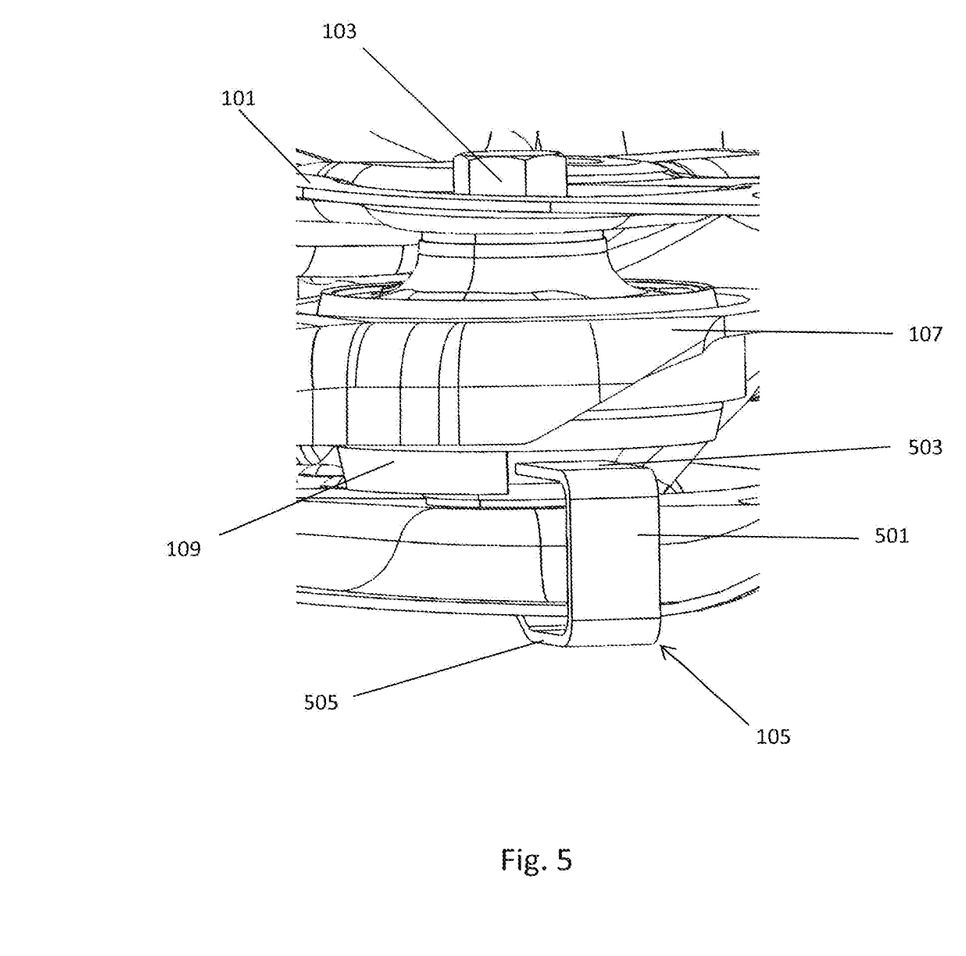
FIG. 5 shows a wheel suspension system according to an example.
Figure 6:
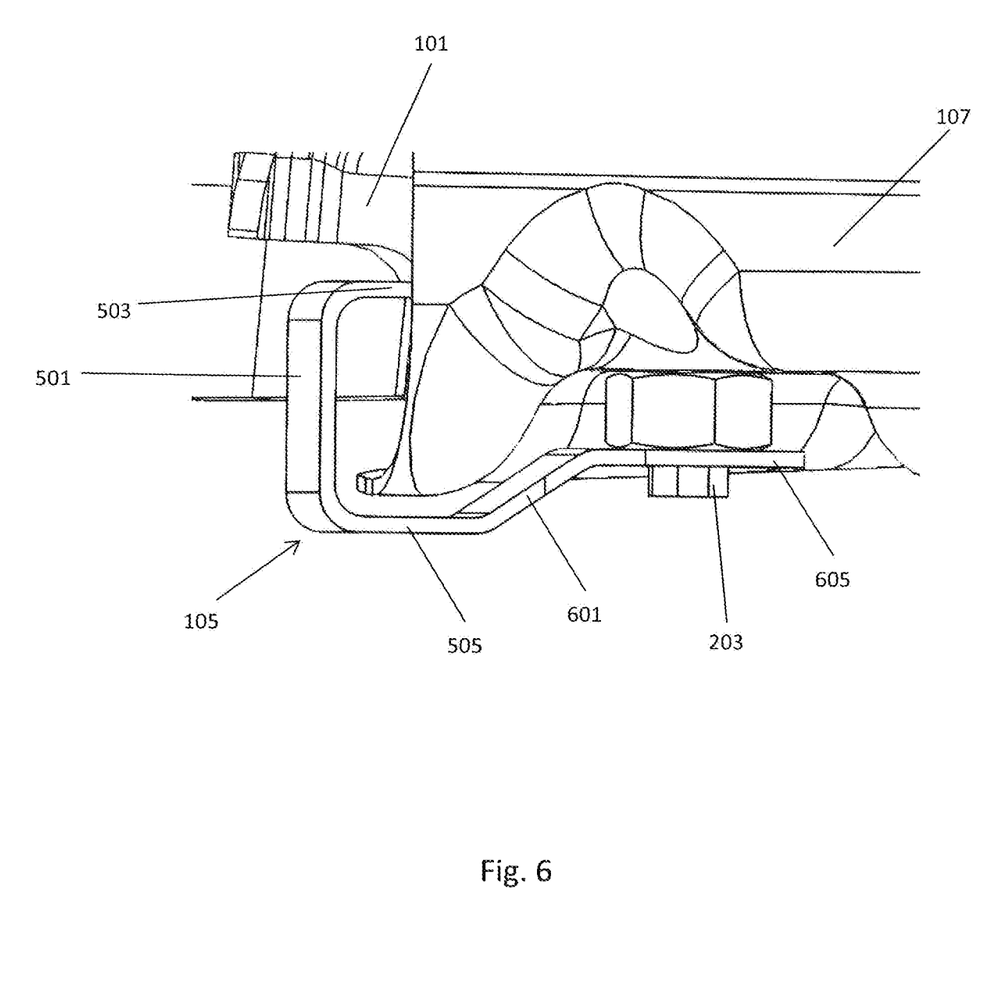
FIG. 6 shows a wheel suspension system according to an example.

Furthermore, in the examples depicted in FIGS. 5 and 6 an exemplary form of the entrainment element 105 is shown, in which the entrainment element 105 is molded bow-shaped and laterally engages around the control arm 107. For this purpose the entrainment element 105 has two bracket limbs 503 and 505 between which the control arm 107 is disposed, as well as a bracket 501, which connects the bracket limbs 503 and 505. The bracket limb 503 is shaped as an entrainment leg, which is carried by the control arm 107 during the rotation of the control arm 107.

Furthermore, as depicted in FIG. 6 the entrainment element 105 comprises a base section 605, which is penetrable by the fastening screw 103. The base section 605 and the bracket limb 505 are connected by a ramp-like disposed connection section 601.

The entrainment element 105 can be produced integrally from bent sheet metal.

Figure 7:
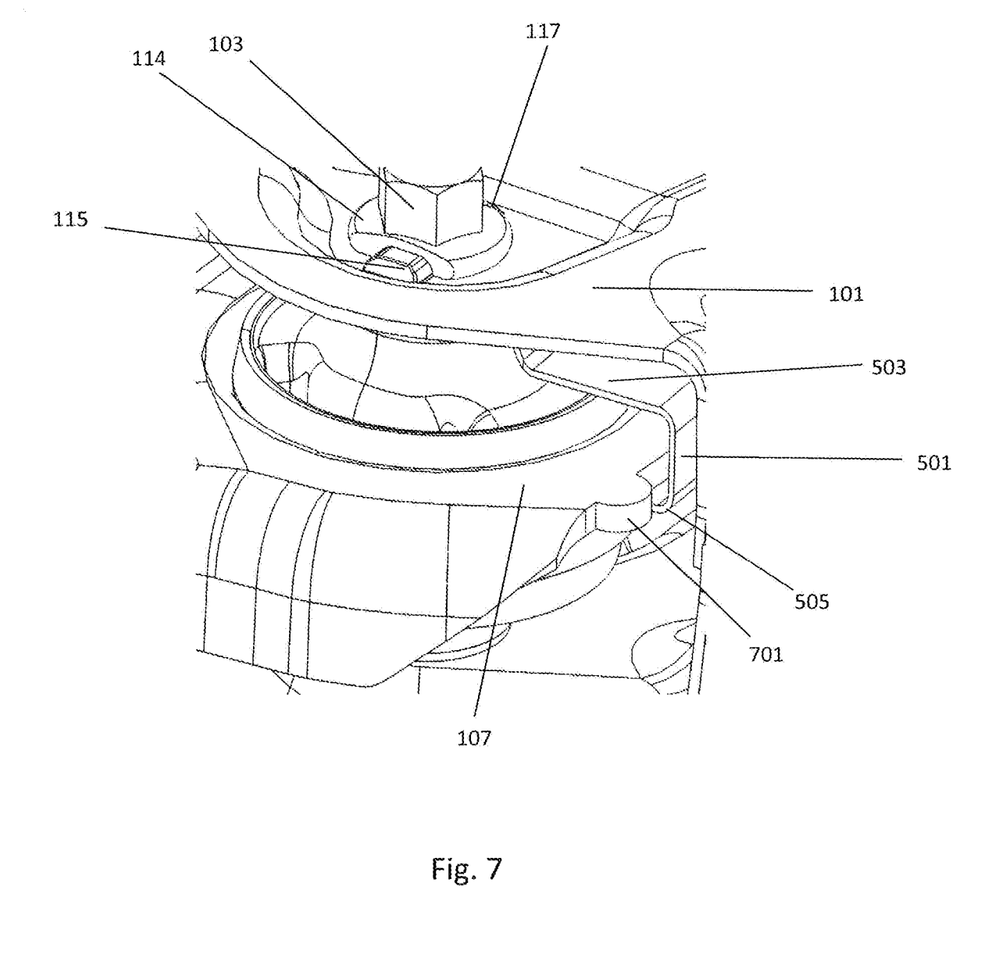
FIG. 7 shows a wheel suspension system according to an example.
Figure 8:
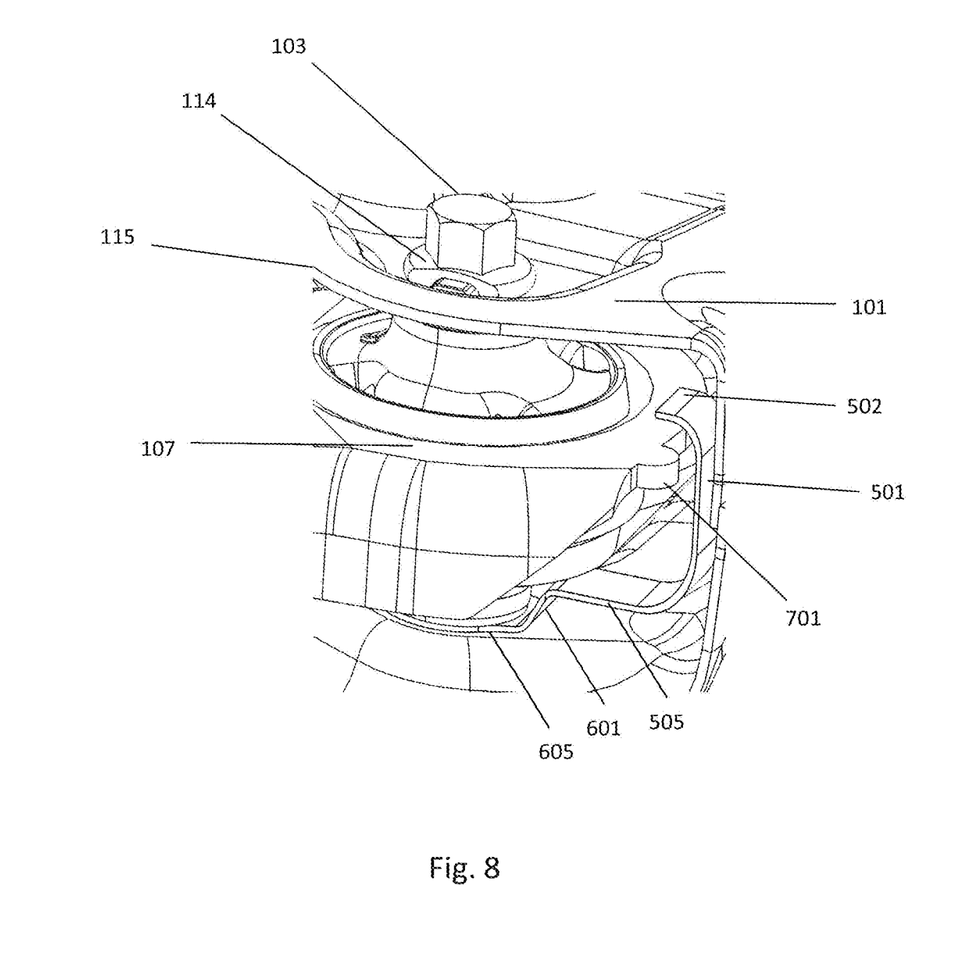
FIG. 8 shows a wheel suspension system according to an example.

In FIGS. 7 and 8 examples of the wheel suspension system 100 are depicted, wherein the control arm 107 comprises an entrainer 701 which, for example, is formed as a radial protrusion and which collides with the entrainment element 105, for example with the bracket limb 501, which can be implemented as an entrainment leg, during the rotation of the control arm 107. Thereby, the entrainment element 105 is rotated in a defined manner.

Figure 9:
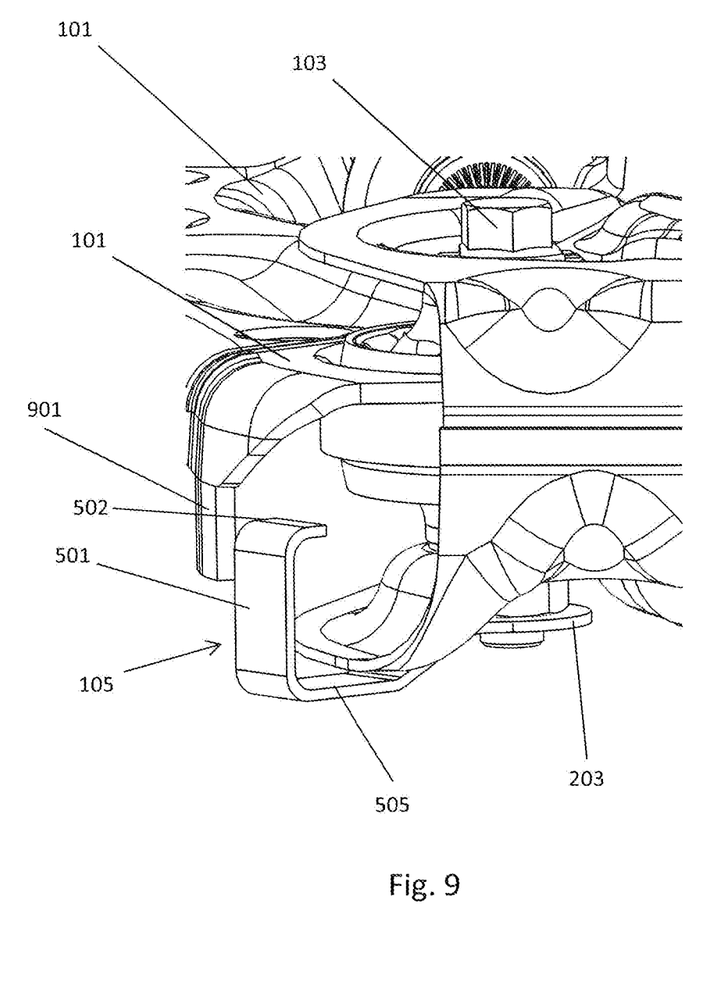
FIG. 9 shows a wheel suspension system according to an example.

In FIG. 9 an example of the wheel suspension system 100 is depicted, in which the control arm comprises an entrainer 901, which is shaped as an entrainment ridge directed in the direction of the entrainment element 107. The entrainer 901 is provided to collide with the entrainment ridge 503 to subject the entrainment element 105 to a force, to produce the torque.

Figure 10A:
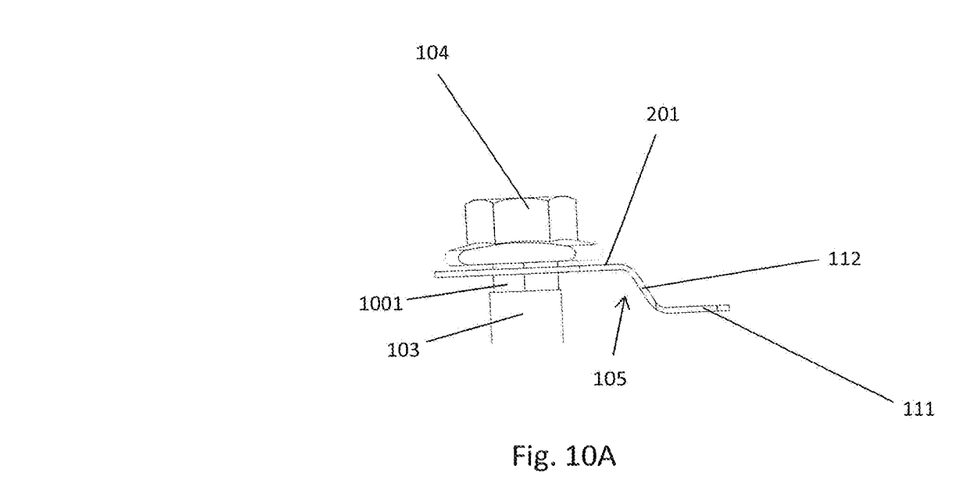
FIGS. 10A through 10C show views of the wheel suspensions system according to an example.
Figure 10B:
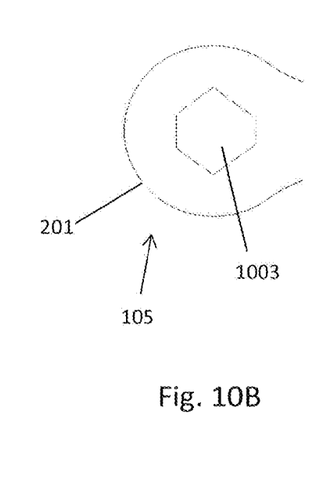
Figure 10C:
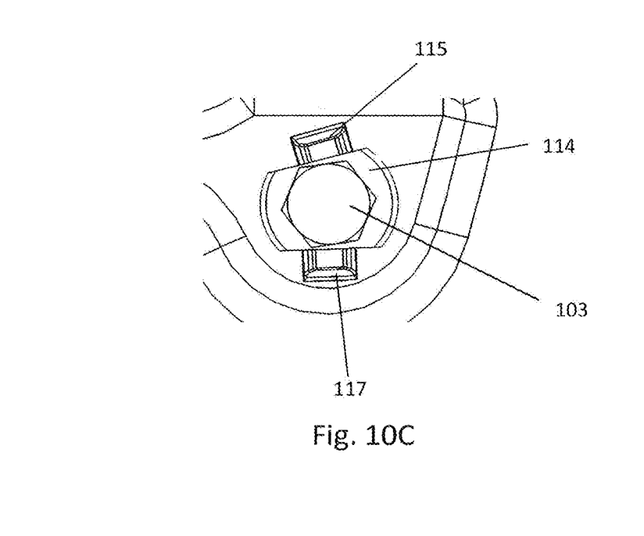

In FIGS. 10A, 10B and 10C views of the wheel suspension system 100 are depicted. The fastening screw 103 can comprise a polygonal shaft 1001 below the screw bead 103, which is provided for the form-fitting and non-rotatable toothing of the fastening screw 103 with the entrainment element 105. For this purpose the entrainment element 105 can comprise an opening 1003 with a corresponding polygonal cross section, which is molded in the base section 201 and penetrable by the shaft 1001. This key-lock-geometry results in a shearing of the fastening screw at the shaft 1001 during a rotation of the entrainment element 105 against the release direction of the fastening screw 103.

As shown in FIG. 10C the rotation lock can be implemented eccentrically, wherein the collar 115 and 117 are disposed in a v-shaped manner. Correspondingly, the plate section 114 can be laterally slanted in a v-shaped manner.

Figure 11:
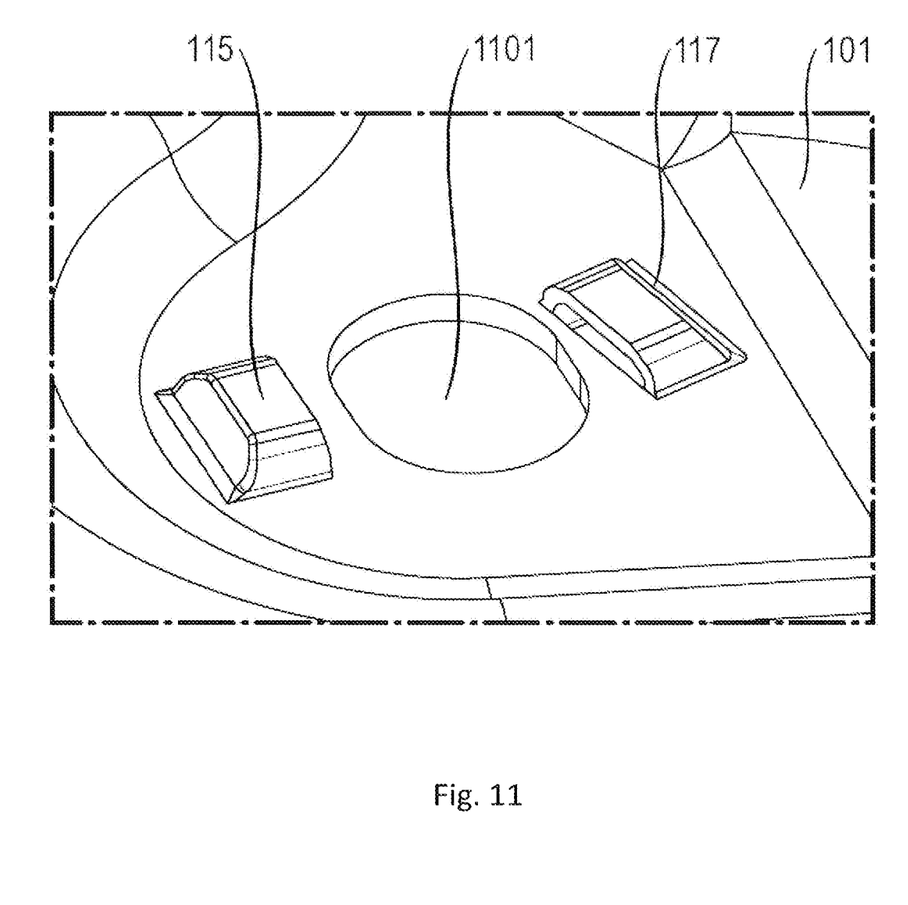
FIG. 11 shows an axle beam according to an example.

In FIG. 11 a view of the axle beam 101 is depicted, comprising an aperture 1101, which is penetrable by the fastening screw 113 as w ell as the rotation lock 115, 117, which is formed by the collars 115, 117 which are disposed on both sides of the aperture 1101. The collars 115, 17 can be molded by a deformation of the axle beam, for example, by pressing.

Figure 12:
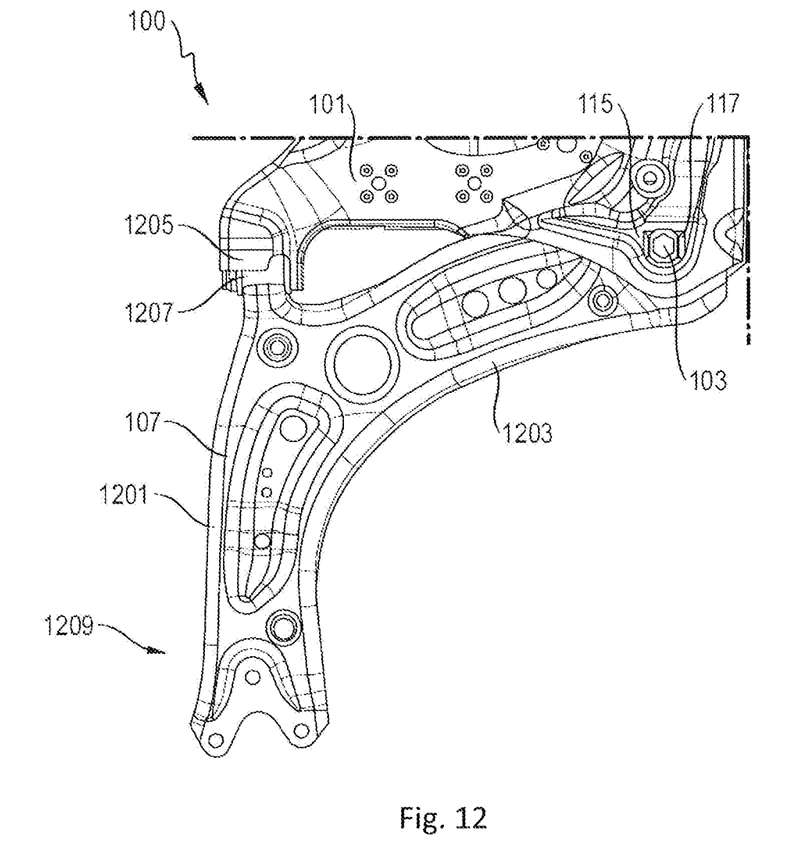
FIG. 12 shows the wheel suspension system according to an example.

In FIG. 12 the wheel suspensions system 100 is depicted according to an example. The control arm 107 comprises a leg on which a retaining bead 1207 is disposed laterally, wherein the receptacle recess 1205 is deformable during the rotational movement of the control arm 107 to release the retaining bead 1207 for the rotation of the control arm 107. The control arm further comprises another leg 1203, which extends from the leg 1201. An end remote from the leg 1201 of the leg 1203 forms a bearing seat for the receiving of the fastening screw 103 as well as the retaining element 105. In this way it is achieved that the control arm 105, for example only rotates counterclockwise during an impact, which can be effected by releasing the retaining bead 1207 by rotation of the control arm 107. The opposite direction of rotation is prevented and non-rotatable. Thereby, the fastening screw 103 can be sheared efficiently.

What is claimed is:

1. A wheel suspension system for a wheel suspension on an axle beam of a vehicle using a fastening screw, comprising:
an entrainment element non-rotatably joinable with the fastening screw and configured to apply a torque to the fastening screw to release a force-locking fastening; and
a control arm configured to be attached to the axle beam by the fastening screw and configured to act on the entrainment element during a rotational movement of the control arm with respect to the axle beam to produce the torque to release the force-locking fastening, wherein the wheel suspension system comprises the axle beam, wherein the axle beam comprises a rotation lock configured to lock a rotational movement of the fastening screw.

2. The wheel suspension system according to claim 1, wherein the entrainment element comprises an entrainment leg, and wherein the control arm is configured to act on the entrainment leg during the rotational movement of the control arm.

3. The wheel suspension system according to claim 2, wherein the entrainment leg is shaped to laterally engage around the control arm.

4. The wheel suspension system according to claim 1, wherein the control arm is configured to act on the entrainment element during the rotational movement of the control arm to a tangential force or configured to put the entrainment element in a rotational movement around a longitudinal axis of the fastening screw.

5. The wheel suspension system according to claim 1, wherein the control arm comprises a protrusion configured to act on the entrainment element.

6. The wheel suspension system according to claim 5, wherein the protrusion comprises a radial protrusion or a collar section.

7. The wheel suspension system according to claim 5, wherein the protrusion is configured to act on an entrainment leg of the entrainment element during the rotational movement of the control arm.

8. The wheel suspension system according to claim 1, wherein the entrainment element comprises an opening that is penetrable by the fastening screw, and wherein the fastening screw is receivable in the opening in a form fitting manner.

9. The wheel suspension system according to claim 8, wherein the fastening screw comprises a screw section with an angular or polygonal cross section, and wherein the opening is angular or polygonal to receive the angular or polygonal cross section in a form fitting manner.

10. The wheel suspension system according to claim 9, wherein the screw section comprises a shaft portion or a screw head.

11. The wheel suspension system according to claim 9, wherein the angular or polygonal cross section comprises a quadrangular, pentagonal or hexagonal cross section.

12. The wheel suspension system according to claim 1, wherein the entrainment element is configured to apply the torque against a release direction of the fastening screw.

13. The wheel suspension system according to claim 1, wherein the entrainment element is configured to release the force-locking fastening by a break of the fastening screw.

14. The wheel suspension system according to claim 1, 10, wherein the axle beam comprises an aperture, that is penetrable by the fastening screw, and wherein the rotation lock comprises, laterally to the aperture, a collar configured to secure the screw head of the fastening screw against rotation.

15. The wheel suspension system according to claim 1, wherein the axle beam comprises an aperture, wherein the aperture comprises a trough configured to receive a screw head of the fastening screw in a form fitting manner.

16. The wheel suspension system according to claim 1, wherein the axle beam comprises an aperture, wherein the control arm comprises a bearing opening, and wherein the bearing opening and the aperture are arranged or are arrangeable in alignment with each other and are penetrable by the fastening screw.

17. The wheel suspension system according to claim 1, wherein the control arm comprises a lateral edge with a retaining bead, wherein the axle beam comprises a receptacle recess for receiving the retaining bead, and wherein the receptacle recess is deformable during the rotational movement of the control arm to release the retaining bead for the rotation of the control arm.

18. The wheel suspension system according to claim 1, wherein the entrainment element is mounted between the axle beam and the control arm or between a nut of the fastening screw and the axle beam.

19. The wheel suspension system according to claim 1, wherein the control arm is a wishbone.

\* \* \* \* \*